United States Patent [19]
Yabe et al.

[11] Patent Number: 5,404,573
[45] Date of Patent: Apr. 4, 1995

[54] CONTROL CHANNEL MONITORING SYSTEM

[75] Inventors: Toshihiro Yabe; Masaru Ohmori, both of Kawasaki, Japan

[73] Assignee: Fujitsu Limited, Kanagawa, Japan

[21] Appl. No.: 21,863

[22] Filed: Feb. 24, 1993

[30] Foreign Application Priority Data

Feb. 25, 1992 [JP] Japan ................................ 4-037976

[51] Int. Cl.⁶ .............................................. H04Q 9/00
[52] U.S. Cl. .................................. 455/33.1; 455/33.2; 455/34.2; 455/54.1; 455/62; 455/53.1; 379/60; 370/95.3
[58] Field of Search ..................... 455/33.1, 33.2, 33.4, 455/34.2, 54.2, 54.1, 67.1, 62, 77, 53.1, 56.1; 370/95.1, 95.3; 379/60, 59

[56] References Cited

U.S. PATENT DOCUMENTS

| | | | |
|---|---|---|---|
| 5,117,502 | 5/1992 | Onoda et al. | 455/33.1 |
| 5,157,661 | 10/1992 | Ianai et al. | 455/33.1 |

FOREIGN PATENT DOCUMENTS 0321739  12/1989  Japan ................................ 455/33.2

*Primary Examiner*—Reinhard J. Eisenzopf
*Assistant Examiner*—Doris H. To
*Attorney, Agent, or Firm*—Nikaido, Marmelstein, Murray & Oram

[57] ABSTRACT

A control channel monitoring system is for a mobile communication system in which base stations independently control radio zones which are arranged in a cellular array. A mobile station accesses the base station using at least one control channel. Each of the base stations constantly transmits using the control channel in common according to a time division multiple access. A voice signal is transmitted between an arbitrary base station and the mobile station according to the time division multiple access via a speech channel. The control channel monitoring system includes a monitoring part for carrying out a monitoring operation in which a transmission quality of the radio zones is monitored by monitoring the control channel. A selection standard is obtained for the radio zone as the mobile station moves. A silence judging part determines whether the voice signal indicates a silent state based on a level of the voice signal. A monitor control part monitors the result of the silence judging part for the voice signal which is exchanged via the speech channel within a certain time which combines each time slot of the control channel corresponding to the adjacent radio zone and a time it takes for the frequency synthesizer to switch the speech and control channels before and after each time slot. The monitor control part switches the oscillation frequency of the frequency synthesizer to a specified frequency in the time slot based on the monitored result to start the monitor process of the monitoring part.

4 Claims, 10 Drawing Sheets

CONTROL CHANNEL MONITORING SYSTEM

FIELD OF THE INVENTION

The present invention generally relates to control channel monitoring systems, and more particularly to a control channel monitoring system which monitors the transmission quality of a control channel of each radio zone adjacent to a radio zone in service so as to obtain a selection standard for the radio zone to which the hand over is to be made in a mobile station of a digital mobile communication system which employs the time division multiple access (TDMA).

BACKGROUND OF THE INVENTION

In a land based communication network, integrated services digital networks (ISDNs) are becoming popular because the ISDN can flexibly cope with the increasing number of subscribers and non-telephone services such as facsimile and data transmissions.

On the other hand, mobile communication systems which provide communication services to mobile stations such as mobile telephones and portable telephones are also becoming popular. In addition, in order to cope with the rapidly increasing number of subscribers and to provide various services similar to those provided by the fixed communication networks, the digital system is expected to replace the existing analog system.

According to the digital mobile communication system, it is possible to carry out various kinds of processings in the transmission path with respect to the transmitting information, and the transmission characteristic of the radio line is satisfactory regardless of the information source. Furthermore, the digital mobile communication system provides an improved privacy of the communication.

FIG. 1 generally shows an example of a conventional digital mobile communication system. In FIG. 1, base stations ($CS_1$ through $CS_{N-1}$) $51_1$ through $51_{N-1}$ are coupled to a public telephone network (PSTN) via a private branch exchange (PBX) 52. A base station ($CS_N$) $51_N$ is coupled to an integrated services digital network (ISDN) via a network (local network) which is operated by a communication company.

The base stations $51_1$ through $51_{N-1}$ form a private mobile communication system which is operated by a person who installs these base stations $51_1$ through $51_{N-1}$ and the private branch exchange 52. This private mobile communication system provides communication services to portable mobile stations ($PS_1$ and $PS_2$) $53_1$ and $53_2$ via digital radio lines which employs the TDMA. The base station $51_N$ forms a public mobile communication system which is operated by a person who installs the base station $51_N$. This public mobile communication system provides a communication service to a portable mobile station ($PS_3$) $53_3$ via a digital radio line.

Of course, each of the base stations $51_1$ through $51_N$ can provide similar communication services to all portable mobile stations located within the respective service areas, and is not limited to providing the communication services to the specific portable mobile stations mentioned above.

In the digital mobile communication system having the construction described above, it is necessary to suppress the blocking probability by providing a large number of speech channels in each radio zone of the plurality of sub systems. For this reason, only one or two channels are allocated as the common control channel or channels for all of the base stations and mobile stations. The control channel is used to exchange control information between the base and mobile stations depending on the calling and receiving operations of each mobile station.

Accordingly, the common control channel must not be used continuously by one particular base station or mobile station. For example, in the down-control channel which is used when the base station accesses the mobile station, an intermittent transmission system is employed whereby each base station makes only one transmission for every period of 125 ms, and the transmission is made in time slots each having a width of 625 $\mu$s as shown in FIG. 2. On the other hand, in the up-control channel which is used when the mobile station accesses the base station, a slotted aloha system which is synchronized to the down-control channel is used as shown in FIG. 2.

In this specification, the up-control channel refers to the control channel which is used when the transmission is made from the mobile station to the base station, and the down-control channel refers to the control channel which is used when the transmission is made from the base station to the mobile station. The terms "up" and "down" are used similarly throughout this specification.

For example, as shown in FIG. 3 the mobile station $53_1$ which is located in a zone a carries out an intermittent receiving operation with the same timing as the intermittent transmission timing of a base station $51_a$ which is located in this zone a. In addition, by the receiving operation of the mobile station $53_1$, the mobile station $53_1$ monitors a call generated thereto while entering the control information which is transmitted from the base station $51_a$. In addition, the mobile station $53_1$ exchanges the control information with the base station $51_a$ via the control channel according to a predetermined control procedure which confirms to the generated call.

The mobile station $53_1$ further sets an oscillation frequency of an internal frequency synthesizer to a frequency corresponding to a speech channel which is allocated by the base station $51_a$, and makes the call via the time slot indicated by the hatchings in FIG. 2.

The mobile station $53_1$ also monitors the deterioration of the speech quality depending on the received electric field level of the speech channel or the like, and as shown in FIG. 3, detects a control channel with the best transmission quality based on the received electric field level of the control channel which is controlled by the base station in each zone which is adjacent to the zone a, the received error rate of the control information and the like if the mobile station $53_1$ detects that the mobile station $53_1$ is moving outside the zone a.

For example, a base station $51_b$ which controls the control channel which is detected by the mobile station $53_1$ as having the best transmission quality allocates an free speech channel to the mobile station $53_1$. Hence, the mobile station $53_1$ continues the call by switching the oscillation frequency of the internal frequency synthesizer to the frequency which specifies the free speech channel.

Compared to the mobile communication system in which the hand over is controlled primarily by the base stations and the switching system, that is, the network, the method of controlling the hand over primarily by the mobile station can considerably reduce the load on the network.

However, according to the conventional mobile station, the process to search the zone to which the hand over of the channel in use is to be made starts after the mobile station detects deterioration of the speech quality in the down-speech channel as the mobile station moves. For this reason, even though the call is being made, the oscillation frequency of the internal frequency synthesizer of the mobile station must be frequently switched to the frequency which specifies the control channel of each adjacent zone until the search process is completed. Accordingly, the speech quality of the call in which the hand over of the channel in use is made greatly deteriorates because the hit time of the call becomes long.

In order to eliminate the above described problem, it is conceivable to provide in the mobile station a frequency synthesizer which can switch its oscillation frequency at an extremely high speed for every time slot of the speech channel, and to dynamically switch and monitor the control channel in each time slot during the call preceding the detection of the deterioration of the speech quality. However, at the present, even the frequency synthesizer having the fastest oscillation frequency switching speed requires a switching time of approximately 1 ms which corresponds to approximately two time slots shown in FIG. 2. Therefore, this conceivable method cannot be realized in actual practice.

SUMMARY OF THE INVENTION

Accordingly, it is a general object of the present invention to provide a novel and useful control channel monitoring system in which the problems described above are eliminated.

Another and more specific object of the present invention is to provide a control channel monitoring system adapted to a mobile communication system in which a plurality of base stations independently control radio zones which are arranged in a cellular array, and a mobile station makes access to the base station using at least one control channel by switching an oscillation frequency of a frequency synthesizer thereof, where each of the base stations constantly makes a transmission by use of the control channel in common according to a time division multiple access, a voice signal is transmitted between an arbitrary base station and the mobile station which is located within a radio zone of the arbitrary base station according to the time division multiple access via a speech channel, and the control channel monitoring system comprises monitoring means for carrying out a monitoring operation in which a transmission quality of the radio zones which are adjacent to the radio zone of the arbitrary base station is monitored by monitoring the control channel and a selection standard is obtained for the radio zone to which the speech channel is to be handed over as the mobile station moves, silence judging means for judging whether or not the voice signal indicates a silent state based on a level of the voice signal relative to a predetermined threshold value, and monitor control means for monitoring the judgement result of the silence judging means for the voice signal which is exchanged via the speech channel within a certain time which combines each time slot of the control channel corresponding to the adjacent radio zone and a time it takes for the frequency synthesizer to switch the speech and control channels before and after each time slot, and for switching the oscillation frequency of the frequency synthesizer to a specified frequency in the time slot based on the monitored judgement result so as to start the monitor process of the monitoring means. According to the control channel monitoring system of the present invention, it is possible to monitor the transmission quality of each radio zone which is adjacent to the radio zone of the arbitrary base station via the control channel, by using the timing with which the voice signal which is transmitted and received between the mobile station and the arbitrary base station becomes silent. In other words, the voice signal during the call will not deteriorate by the monitoring, and the mobile station can obtain the transmission quality prior to detecting the deterioration of the speech quality as the mobile station moves during the call. Hence, it is possible to efficiently select the radio zone to which the hand over is to be made during the call, and the service quality and operation efficiency of the mobile communication system are greatly improved.

Other objects and further features of the present invention will be apparent from the following detailed description when read in conjunction with the accompanying drawings.

DESCRIPTION OF THE PREFERRED EMBODIMENTS

Figure 4:
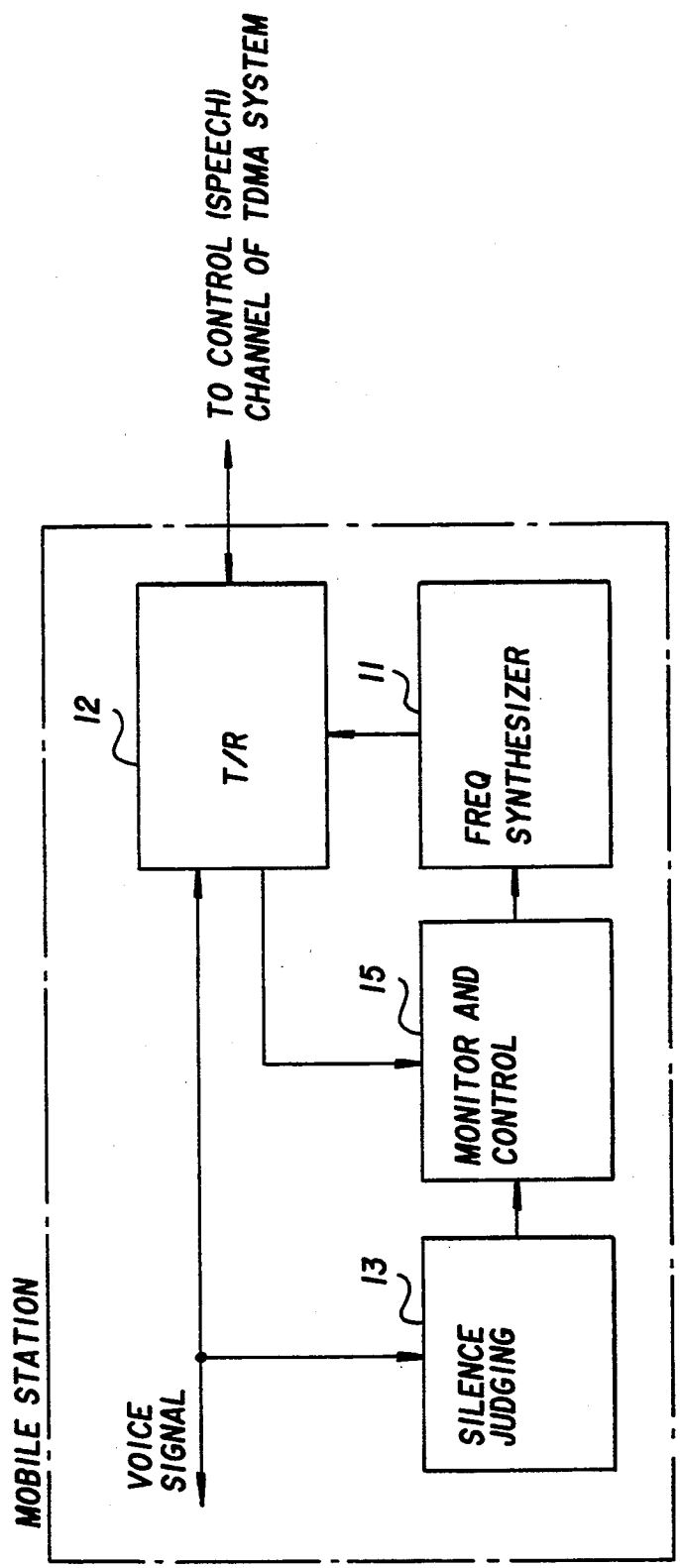
FIG. 4 is a system block diagram for explaining the operating principle of the present invention.

First, a description will be given of the operating principle of the present invention, by referring to FIG. 4. FIG. 4 shows an essential operating principle of a mobile station.

The present invention is applied to a mobile communication system in which a plurality of base stations independently control radio zones which are arranged in a cellular array, and a mobile station makes access to the base station using at least one control channel. The base stations constantly transmit by use of the control channel in common according to the TDMA. A voice signal is transmitted between an arbitrary base station and the mobile station which is located within the radio zone of this arbitrary base station according to the TDMA via a speech channel which forms the transmission path. The transmission between the arbitrary base station and the mobile station using the control channel and the speech channel is made via a transmitter/receiver means 12 of the mobile station.

The mobile station accesses the control channel and the speech channel by switching an oscillation frequency of a frequency synthesizer 11, and a monitor and control 15 monitors the transmission quality of the radio zones which are adjacent to the radio zone of the arbitrary base station by monitoring the control channel. The mobile station also obtains a selection standard from the monitor and control 15 for the radio zone to which the speech channel is to be handed over as the mobile station moves.

A silence judging means 13 of the mobile station determines whether or not the voice signal indicates a silent state based on the level of the voice signal relative to a predetermined threshold value. The monitor and control 15 of the mobile station monitors the result of the silence judging means 13 for the voice signal which is exchanged via the speech channel within a certain time which combines each time slot of the control channel corresponding to the adjacent radio zones and a time it takes for the frequency synthesizer 11 to switch the speech and control channels before and after each time slot. In addition, the monitor and control 15 switches the oscillation frequency of the frequency synthesizer 11 to a specified frequency in the time slot based on the monitored judgement result and starts a monitor process.

In other words, if the monitor and control 15 recognizes through the silence judging means 13 that the voice signal to be exchanged via the speech channel is in the silent state within the certain time, the monitor and control 15 starts the monitor process so as to switch the oscillation frequency of the frequency synthesizer 11 in the time slot which corresponds to the control channel of the adjacent radio zone to the frequency which corresponds to this control channel and to monitor the transmission quality of this control channel. Accordingly, the mobile station can positively monitor the transmission quality of each radio zone which is adjacent to the radio zone of the arbitrary base station by utilizing the time in which the voice signal is in the silent state.

Figure 5:
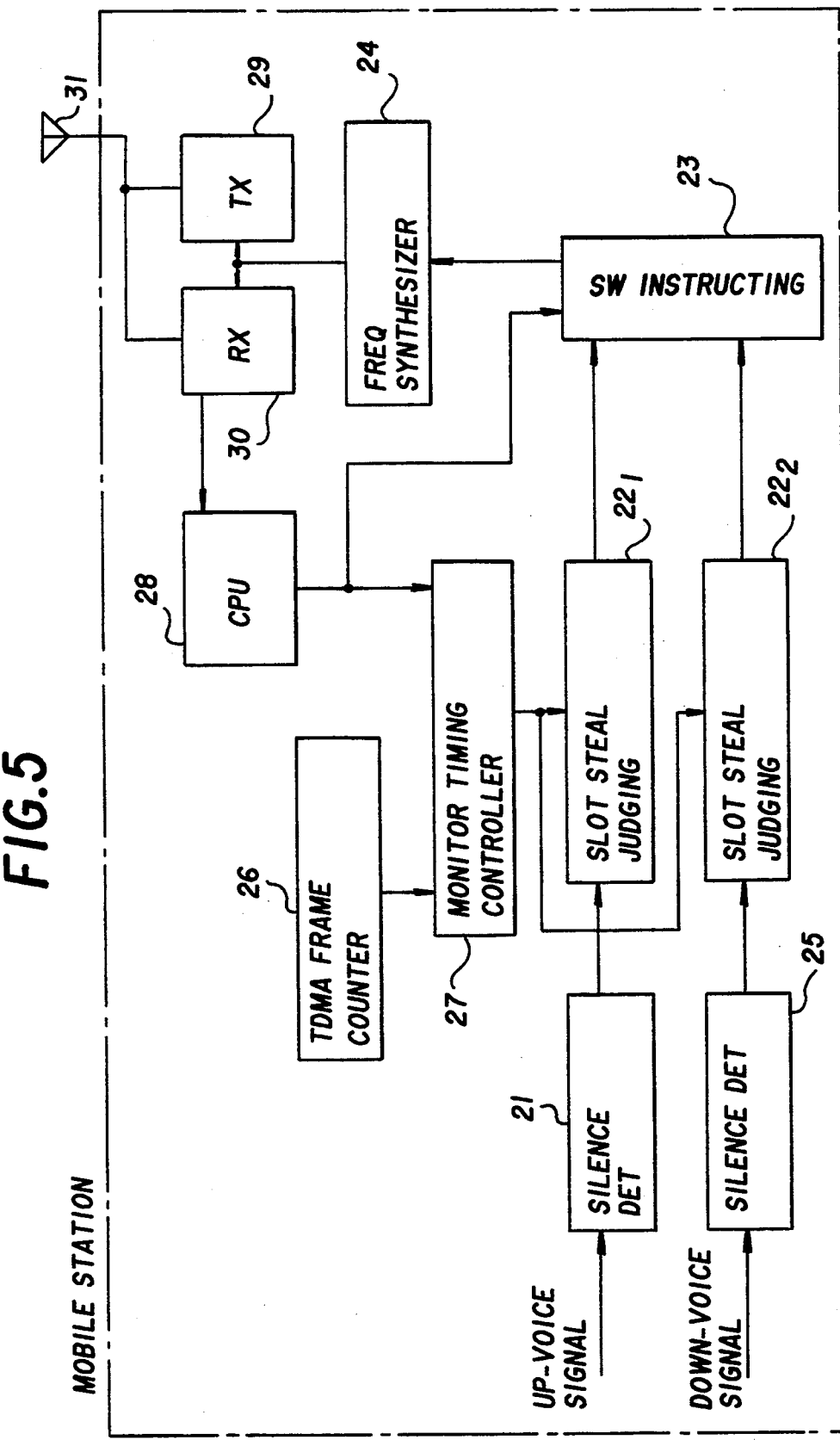
FIG. 5 is a system block diagram showing an essential part of an embodiment of a control channel monitoring system according to the present invention.

Next, a description will be given of an embodiment of a control channel monitoring system according to the present invention, by referring to FIG. 5. FIG. 5 shows an essential part of a mobile station.

The mobile station shown in FIG. 5 generally includes a transmitting voice silence detector 21, slot steal judging circuits $22_1$ and $22_2$, a switch instructing circuit 23, a frequency synthesizer 24, a received voice silence detector 25, a TDMA frame counter 26, a monitor timing controller 27, a central processing unit (CPU) 28, a transmitter 29, a receiver 30, and an antenna 31 which are connected as shown.

In FIG. 5, an up-voice signal which is to be transmitted to a base station (not shown) via an up-speech channel is input to the transmitting voice silence detector 21. An output of this transmitting voice silence detector 21 is supplied to one input of the slot steal judging circuit $22_1$. An output of the slot steal judging circuit $22_1$ is supplied to a first input of the switch instructing circuit 23, and an output of the switch instructing circuit 23 is supplied to a control input of the frequency synthesizer 24.

On the other hand, a down-voice signal which is received from a base station (not shown) via a down-speech channel is input to the received voice silence detector 25. An output of this received voice silence detector 25 is supplied to one input of the slot steal judging circuit $22_2$. An output of the slot steal judging circuit $22_2$ is supplied to a second input of the switch instructing circuit 23.

An output of the TDMA frame counter 26 is input to the monitor timing controller 27, and an output of the monitor timing controller 27 is input to the other inputs of the slot steal judging circuits $22_1$ and $22_2$. An output of the CPU 28 is supplied to a control input of the monitor timing controller 27 and to a third input of the switch instructing circuit 23. An oscillation output of the frequency synthesizer 24 is supplied to the transmitter 29 and to the receiver 30. The transmitter 29 and the receiver 30 respectively transmit information to and receive information from a digital radio line which employs the TDMA via the antenna 31.

The frequency synthesizer 24 corresponds to the frequency synthesizer 11 shown in FIG. 4. The transmitting voice silence detector 21 and the received voice silence detector 25 correspond to the silence judging means 13 shown in FIG. 4. The TDMA frame counter 26, the monitor timing Controller 27, the slot steal judging circuits $22_1$ switch and $22_2$ instructing circuit 23 and the CPU 28 correspond to the monitor and control 15 shown in FIG. 4. In addition, the transmitter 29 and the receiver 30 correspond to the transmitter/receiver means 12 shown in FIG. 4.

Figure 6:
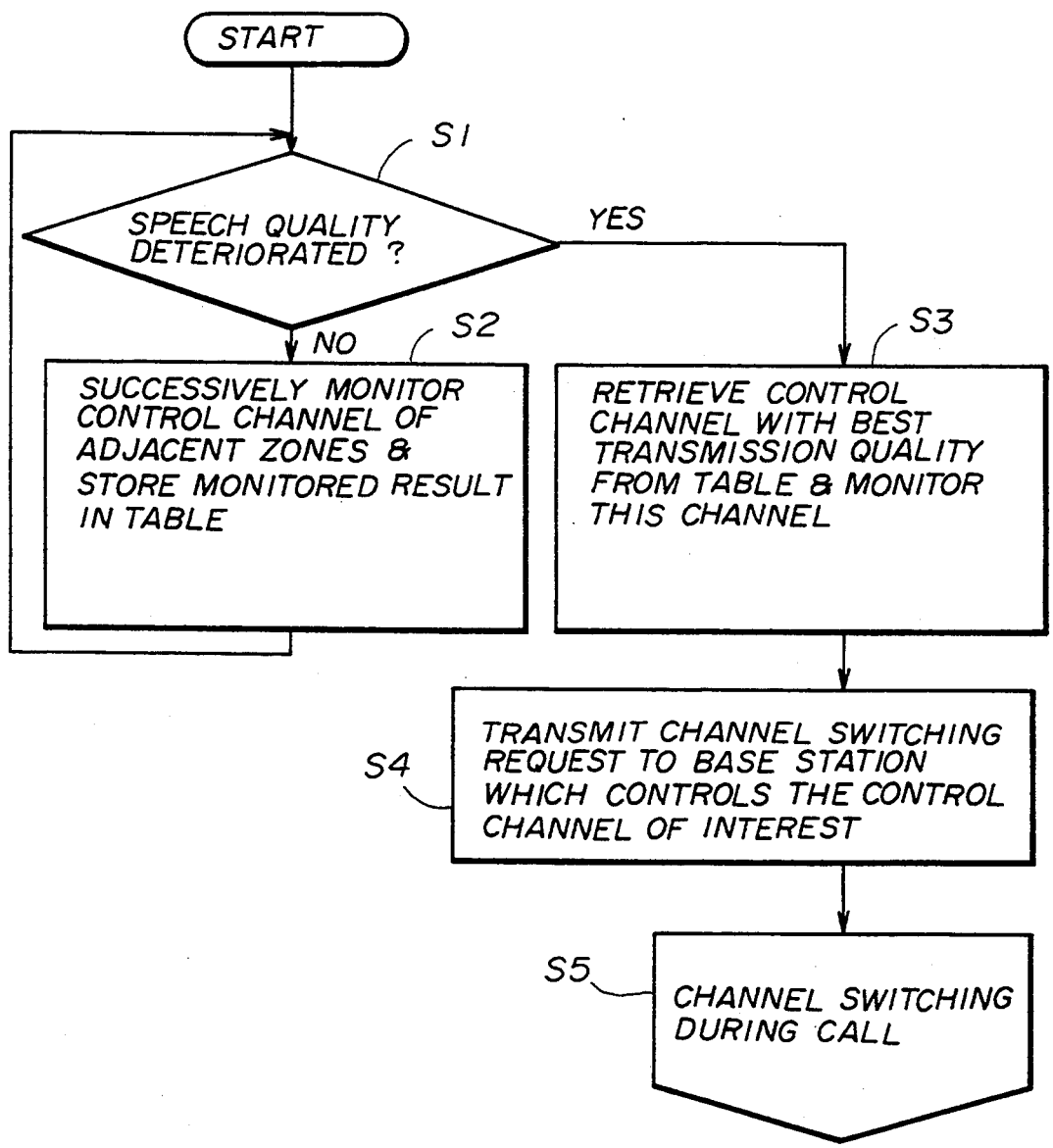
FIG. 6 is a flow chart for explaining the operation of the embodiment.
Figure 7:
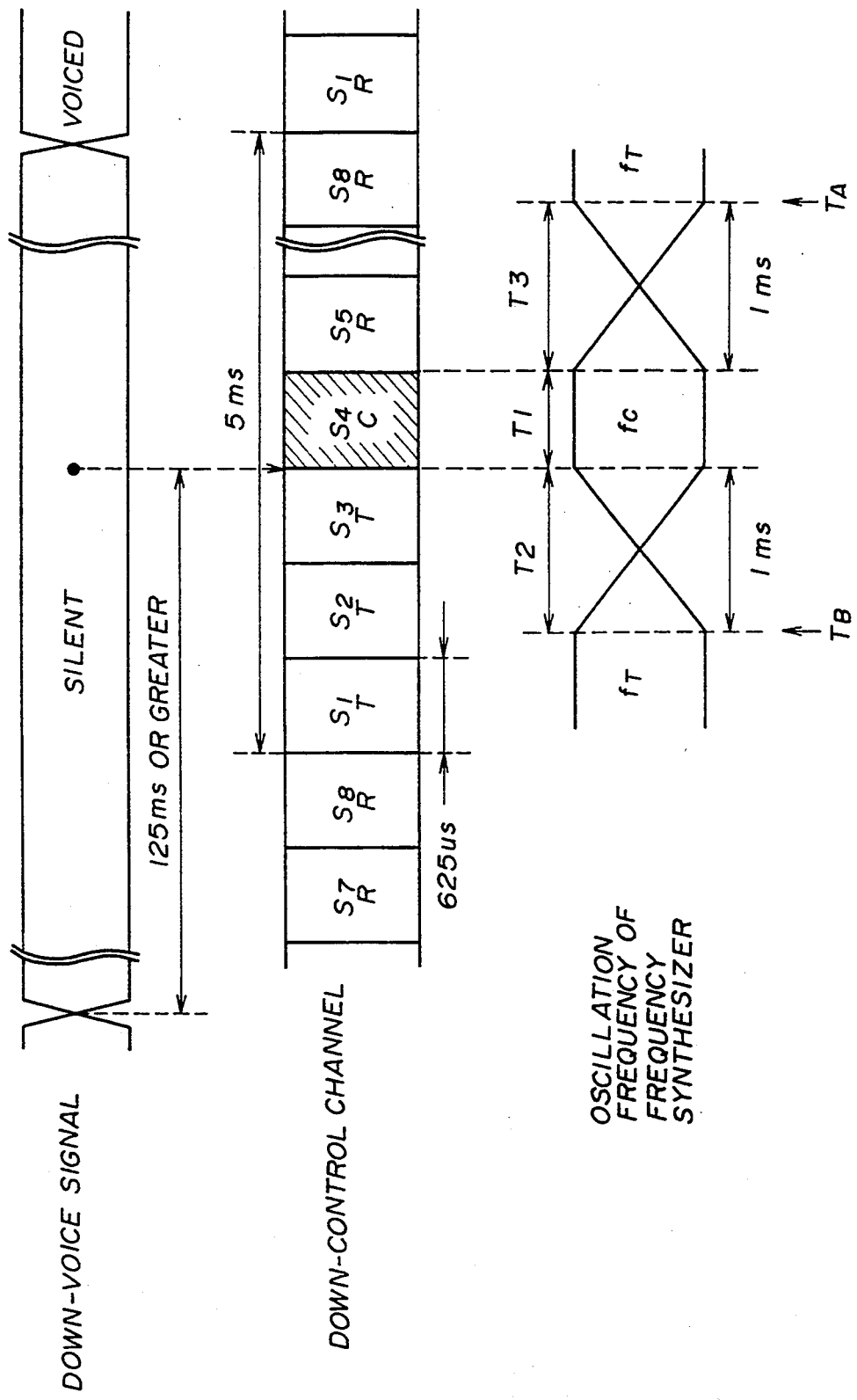
FIG. 7 is a diagram for explaining the oscillation frequency switching operation of a frequency synthesizer of the embodiment.

Next, a description will be given of the operation of this embodiment, by referring to FIGS. 6 and 7. FIG. 6 is a flow chart for explaining the operation of this embodiment, and FIG. 7 is a diagram for explaining the oscillation frequency switching operation of the frequency synthesizer 24.

Figure 3:
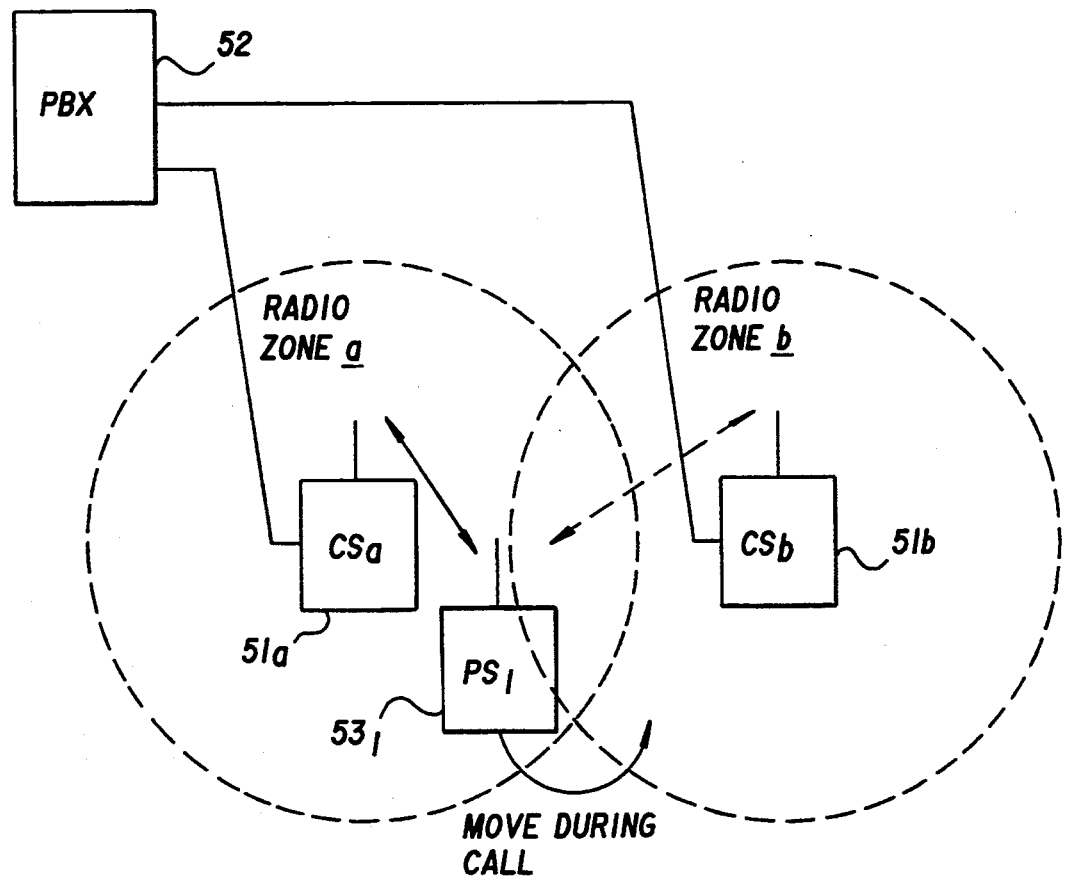
FIG. 3 is a diagram for explaining the hand over of the channel in the digital mobile communication system.

For the sake of convenience, it will be assumed that a mobile station $53_1$ which is making a call within a zone a which is controlled by a base station $51_a$ in FIG. 3 moves to an adjacent zone b which is controlled by a base station $51_b$.

In the mobile station $53_1$ the CPU 28 at the start of a call makes reference to zone structure information which is prestored in a memory (not shown) of the CPU 28 in the form of a table, so as to recognize control channels and the respective time slots in which an access can be made to the base station of each zone which is adjacent to or overlaps the zone a in which the mobile station $53_1$ is located. Then, in a step S1, the CPU 28 decides whether or not the speech quality of the channel in use has deteriorated below a predetermined threshold value.

More particularly, the CPU 28 supplies to the switch instructing circuit 23 specifying information which specifies the oscillation frequency of the frequency synthesizer to the frequency which corresponds to the control channel. In addition, the CPU 28 supplies to the monitor timing controller 27 a control signal which successively specifies the access timing to each selected time slot of the control channel one time slot at a time.

The transmitting voice silence detector 21 monitors the power level of the up-voice signal of the speech channel for every intermittent transmission period of 125 ms, and transmits a first judgement signal (transmitting voice silence judgement result) which indicates the fall of the power level below a predetermined threshold value. On the other hand, the received voice silence detector 25 monitors the power level of the down-voice signal of the speech channel for every intermittent receiving period of 125 ms, and transmits a second judgement signal (received voice silence judgement result) which indicates the fall of the power level below a predetermined threshold value. In other words, the silence detectors 21 and 25 respectively assume that the next time slot will also be silent if the detected time slot is silent.

The monitor timing controller 27 transmits a timing signal which indicates the monitor timing of the control channel which is specified by the control signal described above, in synchronism with the signal which is output from the TDMA frame counter 26 and indicates the timing of each time slot. As shown in FIG. 7, this timing signal indicates a timing including a time T1 occupied by the time slot in which the control channel is monitored, a time T2 it takes for the frequency synthesizer 24 to switch the oscillation frequency to a frequency $f_c$ which corresponds to the control channel prior to this time slot, and a time T3 it takes for the frequency synthesizer 24 to switch the oscillation frequency back to a frequency $f_T$ which corresponds to the original speech channel after the monitoring is completed.

The top portion of FIG. 7 shows the down-voice signal, and the central portion of FIG. 7 shows the down-control channel. The bottom portion of FIG. 7 shows the oscillation frequency of the frequency synthesizer 24.

The slot steal judging circuit $22_1$ transmits an up-voice silent signal if both the timing signal and the first judgement signal have the active level. On the other hand, the slot steal judging circuit $22_2$ transmits a down-voice silent signal if both the timing signal and the second judgement signal have the active level.

The switch instructing circuit 23 switches and supplies to the frequency synthesizer 24 the specifying information described above or specifying information related to the speech channel which is allocated at the start of the call, depending on the logic levels of the up and down-voice silent signals.

The judgement as to whether or not to switch the oscillation frequency of the frequency synthesizer 24 from the frequency of the speech channel to that of the control channel is carried out depending on the time which is required to switch the oscillation frequency for the individual frequency synthesizer 24 and the time slot position of the control channel which is to be monitored. For example, if the time required to switch the oscillation frequency is approximately 1 ms as shown in FIG. 7 and the time slot position of the control channel which is to be monitored matches $S_1$ shown in FIG. 2, the switch instructing circuit 23 confirms that the up-voice silent signal has the active level in order to secure the time which is required to switch from the speech channel to the control channel. In this case, the time which is required to switch the oscillation frequency is less than the length of two time slots ($=625 \mu s \times 2$).

Figure 1:
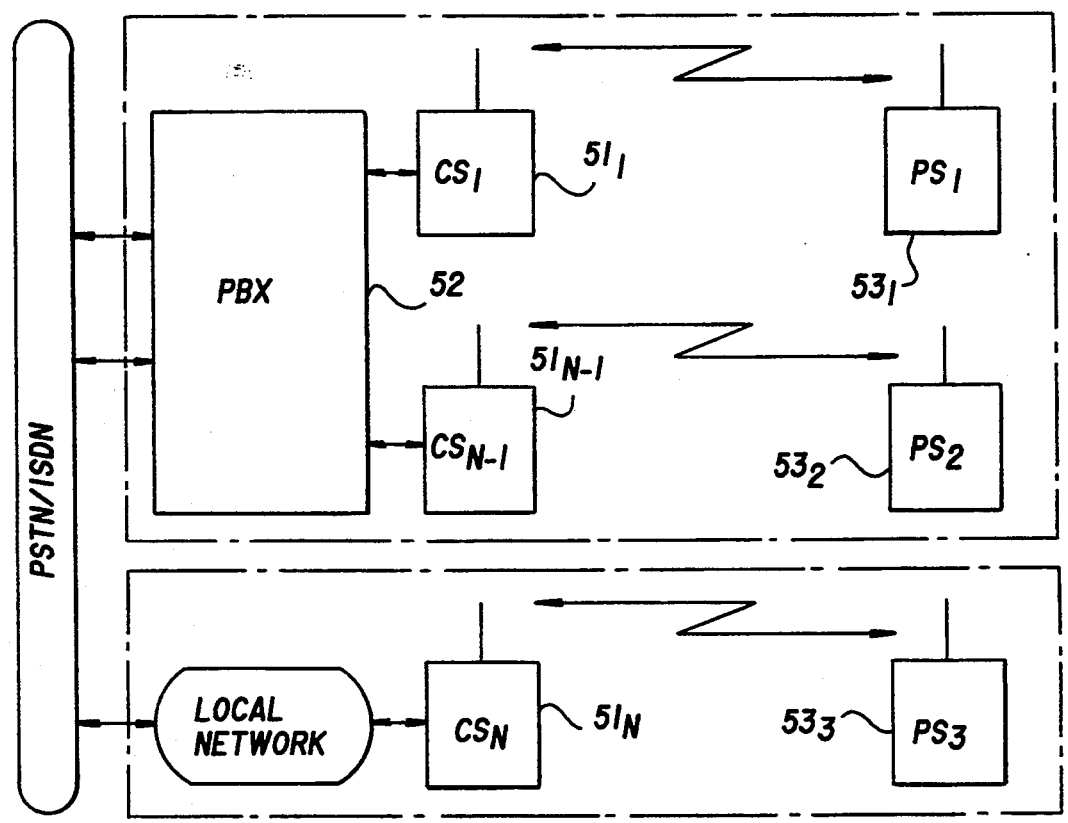
FIG. 1 is a system block diagram showing an example of a conventional digital mobile communication system.
Figure 2:
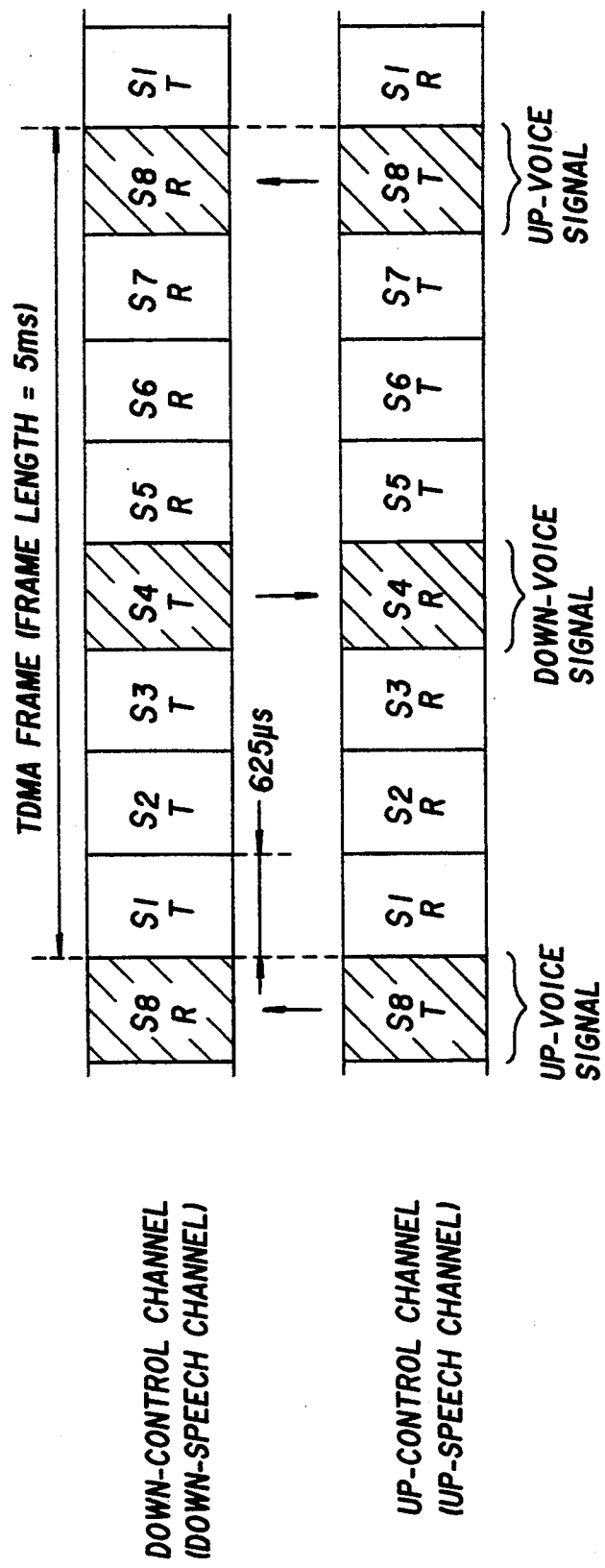
FIG. 2 is a diagram for explaining a TDMA frame structure.

In addition, if the time slot position of the control channel which is to be monitored matches $S_3$ shown in FIG. 2, the switch instructing circuit 23 confirms that the down-voice silent signal has the active level in order to secure the time which is required to switch from the control channel to the speech channel after the monitoring is completed.

Furthermore, if the time slot position of the control channel which is to be monitored matches $S_2$ shown in FIG. 2, the switch instructing circuit 23 confirms that the up-voice silent signal has the active level in order to secure the time which is required to switch from the speech channel to the control channel, and confirms that the down-voice silent signal has the active level in order to secure the time which is required to switch from the control channel to the speech channel after the monitoring is completed.

Moreover, if the time slot position of the control channel which is to be monitored matches $S_4$ shown in FIG. 2, the switch instructing circuit 23 confirms that the up-voice silent signal has the active level in order to monitor the control channel.

As in the case of the conventional mobile station, the mobile station $53_1$ of this embodiment includes a voltage controlled crystal oscillator (not shown) for automatically and intermittently controlling the transmission depending on the level of the up-voice signal. Hence, if the up-voice silent signal has the active level, the transmission with respect to the base station is restricted simultaneously as the control channel monitoring operation or the oscillation frequency switching operation which is controlled under the voltage controlled crystal oscillator. In addition, if the transmission of the up-voice signal with respect to the base station in the time slot $S_8$ shown in FIG. 2 is not restricted, the mobile station $53_1$ successively codes and transmits the voice signal which precedes this time slot $S_8$ by a transmission period ($=125$ ms) of the time slot.

As described above, the frequency synthesizer 24 switches the oscillation frequency based on the specifying information which is received via the switch instructing circuit 23. The receiver 30 supplies to the CPU 28 the received electric field level of the control channel and the demodulated output in the step S1 shown in FIG. 6 depending on the oscillation frequency $f_c$ of the frequency synthesizer 24.

If the decision result in the step S1 is NO, the CPU 28 in a step S2 shown in FIG. 6 successively monitors the control channel of the adjacent zones depending on the received electric field level and the demodulated output, and stores the monitored results in the memory of the CPU 28 in the form of a table. Then, the process returns to the step S1.

On the other hand, if the speech quality of the speech channel deteriorates and the decision result in the step S1 becomes YES, the CPU 28 selects the control channel having the best transmission quality in a step S3 by referring to the monitored results and also monitors this control channel via the frequency synthesizer 24 and the receiver 30. In addition, the CPU 28 transmits a channel switching request to the base station $51_b$ in a step S4 via the control channel if the CPU 28 decides that the monitored control channel is accessible.

The base station $51_b$ allocates a free speech channel to the mobile station $53_1$ in response to the channel switching request. Hence, in a step S5 shown in FIG. 6, the CPU 28 of the mobile station $53_1$ switches the oscillation frequency of the frequency synthesizer 24 to a frequency corresponding to the free speech channel, so as to continue the call.

According to this embodiment, it is possible to monitor the control channel and to switch the oscillation frequency of the frequency synthesizer 24 required for the monitoring, with the timing of the time slot in which the up and down-voice signals indicating the silent state are exchanged via the speech channel. For this reason, it is possible to positively monitor the transmission quality of the adjacent zones simultaneously as the call by use of an existing frequency synthesizer and without deteriorating the speech quality.

Figure 8:
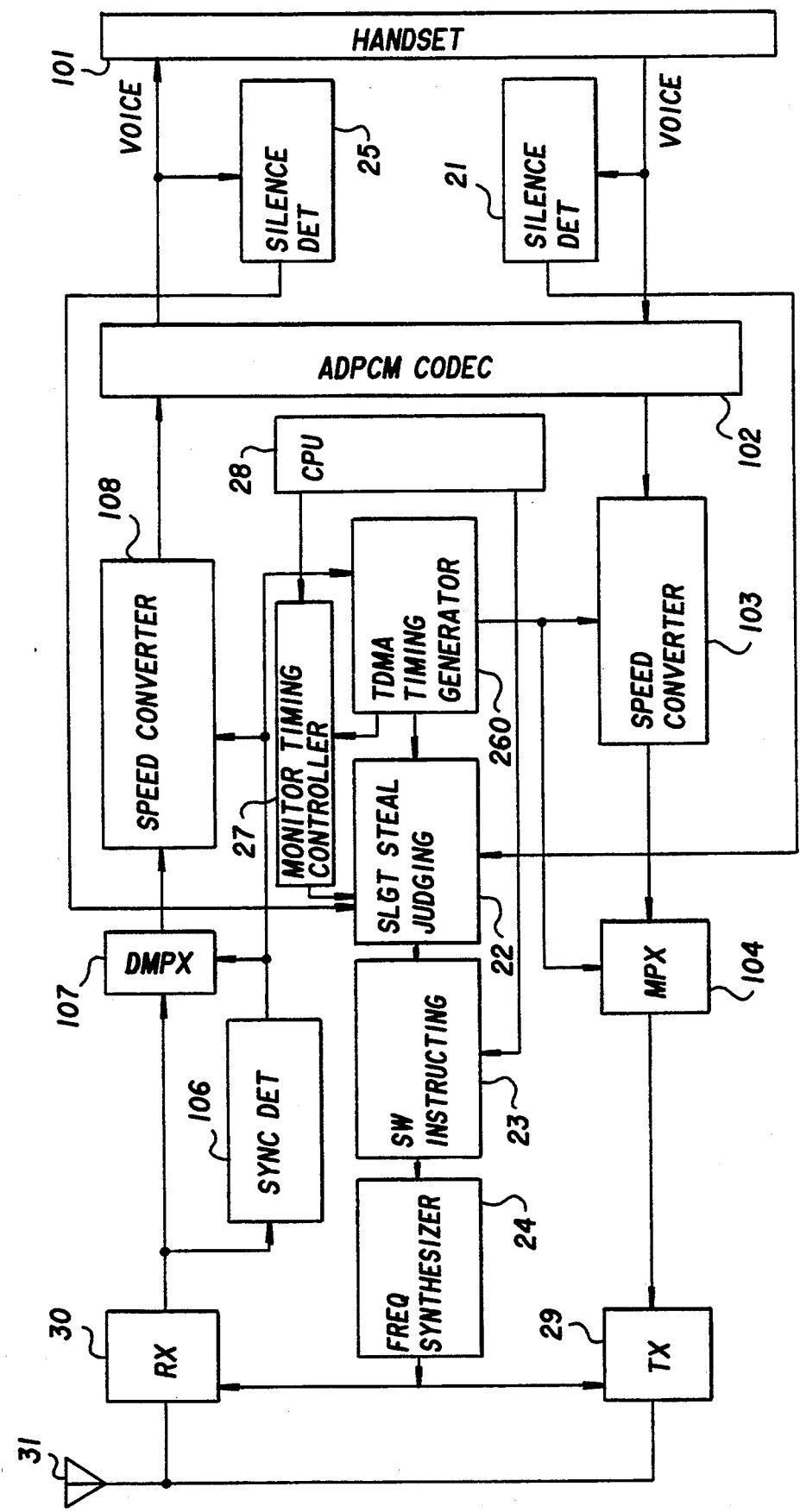
FIG. 8 is a system block diagram showing the embodiment of the control channel monitoring system in more detail.

Next, a more detailed description will be given of this embodiment, by referring to FIG. 8. In FIG. 8, those parts which are the same as those corresponding parts in FIG. 5 are designated by the same reference numerals, and a description thereof will be omitted.

The mobile station shown in FIG. 8 includes a receiver 30, a synchronous detector 106, a TDMA demultiplexer 107, a speed converter 108, an adaptive differential pulse code modulation codec (ADPCM coder/decoder) 102, a received voice silence detector 25, a handset 101, a transmitting voice silence detector 21, a speed converter 103, a TDMA multiplexer 104, a transmitter 29, a CPU 28, a TDMA timing generator 260, a monitor timing controller 27, a slot steal judging part 22, a switch instructing circuit 23, and a frequency synthesizer 24 which are connected as shown.

The signal received by the antenna 31 is supplied to the synchronous detector 106 and the TDMA demultiplexer 107 via the receiver 30. The synchronous detector 106 detects the synchronizing timing which is determined by the base station from which the signal is received, and controls the operation timings of the TDMA demultiplexer 107, the speed converter 108 and the TDMA timing generator 260. Hence, the received signal is demultiplexed in the TDMA demultiplexer 107 with the timing which is determined by the synchronous detector 106, and is further subjected to a speed conversion in the speed converter 108 with the timing which is determined by the synchronous detector 106. The output of the speed converter 108 is decoded in the ADPCM codec 102 and is supplied to the handset 101.

On the other hand, the transmitting signal from the handset 101 is encoded in the ADPCM codec 102 and is supplied to the speed converter 103. The speed converter 103 carries out the necessary speed conversion and the transmitting signal is multiplexed in the TDMA multiplexer 104. The operation timings of the speed converter 103 and the TDMA multiplexer 104 are controlled by an output of the TDMA timing generator 260 which determines the timings based on the output of the synchronous detector 106, that is, based on the transmitting timing of the base station. The transmitting signal from the TDMA multiplexer 104 is transmitted to the base station via the transmitter 29 and the antenna 31.

The above receiving and transmitting operations of the mobile station and the circuit parts associated therewith are known, and a detailed description thereof will be omitted in the present specification.

Figure 9:
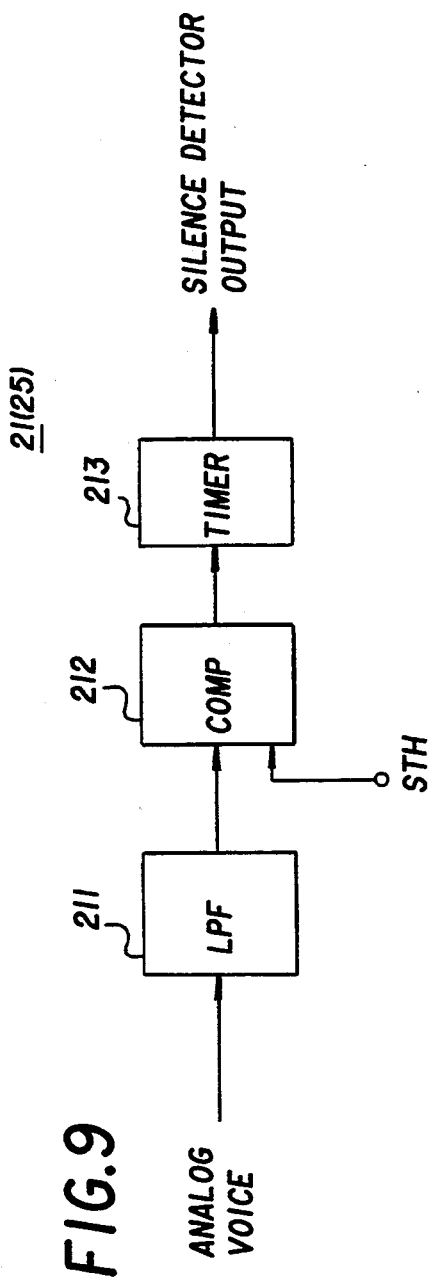
FIG. 9 is a system block diagram showing an embodiment of a silence detector shown in FIG. 8.

FIG. 9 shows an embodiment of the transmitting voice silence detector 21. The received voice silence detector 25 has the same construction as the transmitting voice silence detector 21, and illustration and description thereof will be omitted.

In FIG. 9, the voice silence detector 21 (or 25) includes a lowpass filter 211, a level comparator 212 and a timer 213. The lowpass filter 211 filters the transmitting (or received) voice signal into a signal indicated by a solid line in FIG. 10 (A). This output signal of the lowpass filter 211 is supplied to the level comparator 212 which also receives a silence threshold signal $S_{TH}$ which is indicated by a dotted line in FIG. 10 (A).

Figure 10A:
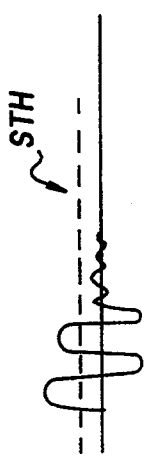
FIG. 10 is a time chart for explaining the operation of the silence detector shown in FIG. 9.
Figure 10B:
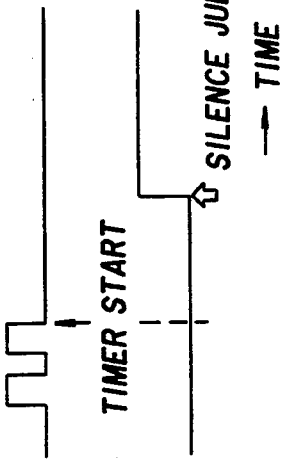
Figure 10C:
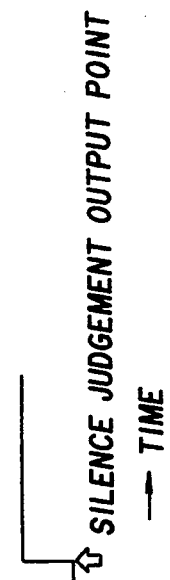

Hence, the level comparator 212 outputs a signal shown in FIG. 10 (B). The timer 213 starts a timer operation in response to a trailing edge of the output signal of the level comparator 212, and outputs a high level shown in FIG. 10 (C) which indicates the detection of a silent state if the output signal of the level comparator 212 does not rise within a predetermined time. This output signal of the timer 213 is supplied to the slot steal judging part 22 shown in FIG. 8.

Figure 11:
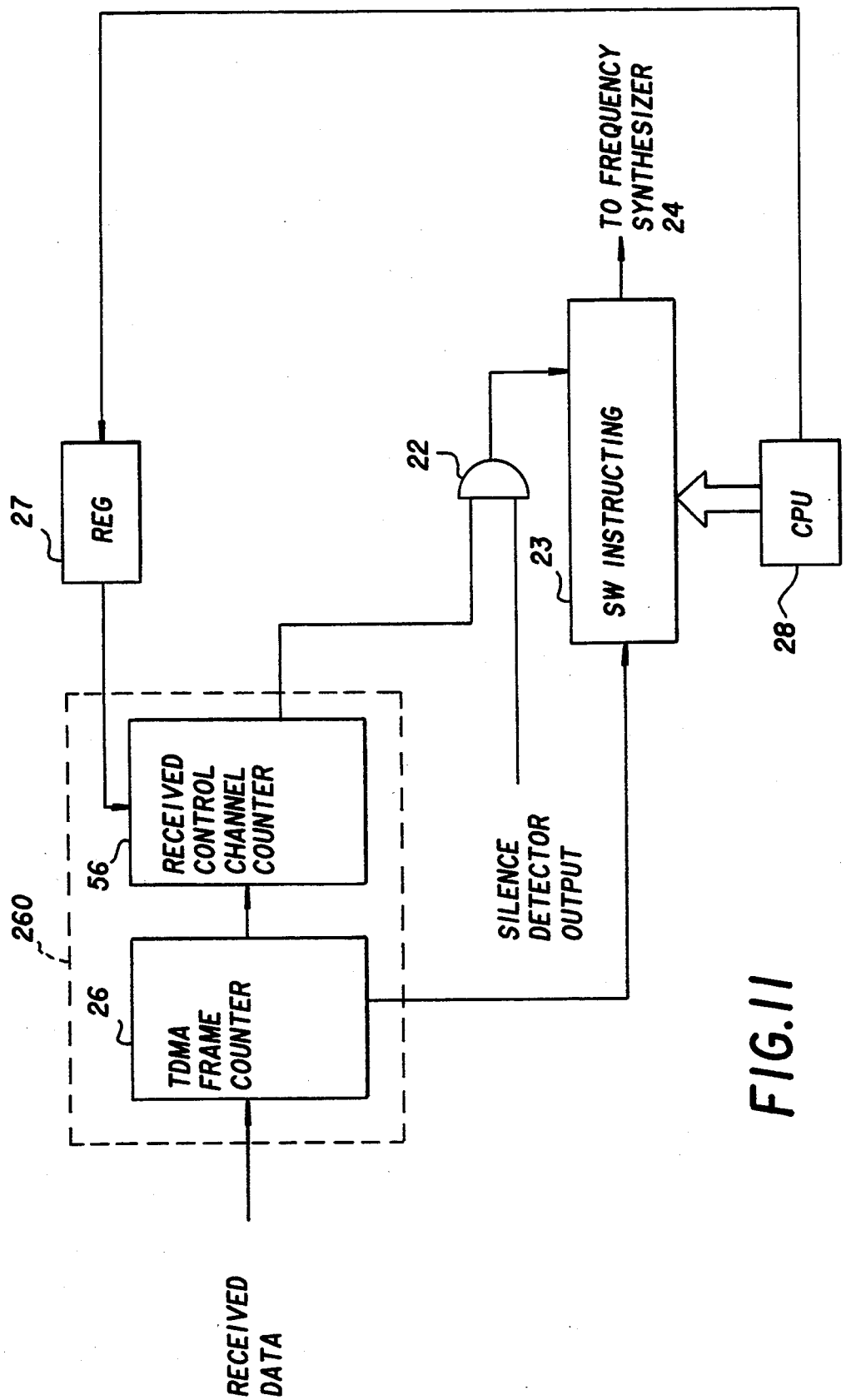
FIG. 11 is a system block diagram showing an essential part of the embodiment shown in FIG. 9 in more detail.

FIG. 11 shows an essential part of the mobile station shown in FIG. 8. In FIG. 11, the TDMA timing generator 260 includes a TDMA frame counter 26 and a TDMA received control channel counter 56. The TDMA frame counter 26 counts the frames based on the output of the synchronous detector 106 shown in FIG. 8, and outputs a signal which is supplied to the switch instructing circuit 23 for switching the synthesizer timing. For example, this output signal of the TDMA frame counter 26 determines the synthesizer switching timing $T_A$ shown in FIG. 7.

On the other hand, the output of the TDMA frame counter 26 is supplied to the TDMA received control channel counter 56. The TDMA received control channel counter 56 outputs a signal which determines the control channel frequency switching timing $T_B$ shown in FIG. 7, for example, and this output signal of the TDMA received control channel counter 56 is supplied to the slot steal judging part 22. A preset terminal PS of the TDMA received control channel counter 56 receives an output signal of the monitor timing controller 27. In this embodiment, the monitor timing controller 27 is a register which receives the control channel timing data from the CPU 28. Hence, the TDMA received control channel counter 56 of the TDMA timing generator 260 can always be aware of the control channel timing from the control channel timing data which is received via the monitor timing controller 26 and generate the signal which determines the control channel frequency switching timing $T_B$ based on the the control channel timing data.

In FIG. 11, the slot steal judging part 22 is made up of an AND circuit which receives the output signal of the TDMA received control channel counter 56 and the output signal of the received voice silence detector 21. Of course, a similar circuitry is provided with respect to the transmitting voice silence detector 25. An output signal of the AND circuit of the slot steal judging part 22 is supplied to the switch instructing circuit 23 which also receives the frequency data from the CPU 28. Hence, the output signal of the switch instructing circuit 23 is supplied to the frequency synthesizer 24 shown in FIG. 8 to control the frequency switching of the frequency synthesizer 24.

The embodiment described heretofore uses the power level of each voice signal with respect to the predetermined threshold value for the purpose of detecting the silent state of the up and down-voice signals. However, the method of detecting the silent state of the voice signals in the present invention is not limited to the method of this embodiment. For example, instead of using the power level, it is possible to use the average value of the amplitudes of the voice signal or the power level of the formant frequency component of the voice signal which is obtained via a predetermined filter.

Of course, the contents of the table which is generated by the CPU 28 and stored in the memory thereof are not limited to those of the described embodiment. In other words, the table contents are not limited to the received electric field level as long as the speech quality obtained in each zone is predictable to a certain accuracy. For example, it is possible to store in the table a bit error rate of the control information which is received from the base station via the control channel of interest.

The described embodiment uses exclusive hardwares for the detection of the silent state of the voice signal, the slot steal judgement, and the switching control of the oscillation frequency of the frequency synthesizer. However, the present invention is not limited to the hardware structures of the described embodiment, and it is possible to realize a part of or all of these functions using a digital signal processor or the like.

The embodiment was described with reference to the digital mobile communication system in which the base stations of all of the zones make the intermittent transmission in frame synchronism with the frame structure shown in FIG. 2. However, in the present invention, the synchronizing relationship among the base stations and the number of time slots within the frame are not limited to those of the described embodiment, as long as the mobile station can recognize the control channel which is to be monitored and the time slot of this control channel for each zone.

Further, the present invention is not limited to these embodiments, but various variations and modifications may be made without departing from the scope of the present invention.

What is claimed is:

1. A control channel monitoring system adapted to a mobile communication system in which a plurality of base stations independently control radio zones which are arranged in a cellular array, and a mobile station makes access to the plurality of base stations using at least one control channel by switching an oscillation frequency of a frequency synthesizer thereof, each of the base stations constantly making a transmission by use of the at least one control channel in common according to a time division multiple access, a voice signal being transmitted between an arbitrary base station and the mobile station which is located within a radio zone of the arbitrary base station according to the time division multiple access via a speech channel, said control channel monitoring system of the mobile station comprising:

monitoring means for monitoring a transmission quality of the radio zones which are adjacent to the radio zone of the arbitrary base station by monitoring the at least one control channel and for obtaining a predetermined threshold standard for the radio zone to which the speech channel is to be handed over as the mobile station moves;

silence judging means for determining whether the voice signal indicates a silent state based on a level of the voice signal relative to a predetermined threshold value; and monitor control means for monitoring a result of said silence judging means for the voice signal which is exchanged via the speech channel within a predetermined time which combines each time slot of the at least one control channel corresponding to an adjacent radio zone and a time it takes for the frequency synthesizer to switch the speech and control channels before and after said each time slot, and for switching the oscillation frequency of the frequency synthesizer to a specified frequency in said each time slot based on the monitored result so as to start a monitor process of said monitoring means.

2. The control channel monitoring system as claimed in claim 1, wherein said monitoring means, said silence judging means and said monitor control means are provided within the mobile station.

3. The control channel monitoring system as claimed in claim 1, wherein said silence judging means monitors a power level of said voice signal of the speech channel for every predetermined intermittent communication period and transmits a judgement signal which indicates a fall of the power level below said predetermined threshold value, said judgement signal indicating the monitored result.

4. The control channel monitoring system as claimed in claim 1, wherein said silence judging means includes first means for monitoring a power level of an up-voice signal of the speech channel for every predetermined intermittent transmitting period and for transmitting a first judgement signal which indicates a fall of the power level of said up-voice signal below said predetermined threshold value, and second means for monitoring a power level of a down-voice signal of the speech channel for every predetermined intermittent receiving period and for transmitting a second judgement signal which indicates a fall of the power level of said down voice-signal below said predetermined threshold value, said first and second judgement signals used as said monitored result.

* * * * *